US012257804B2

(12) United States Patent
Hallendorff

(10) Patent No.: US 12,257,804 B2
(45) Date of Patent: Mar. 25, 2025

(54) METHOD FOR MANUFACTURING OF CARTONS

(71) Applicant: Optibinary AB, Eksjo (SE)

(72) Inventor: Per Hallendorff, Eksjo (SE)

(73) Assignee: OPTIBINARY AB, Eksjo (SE)

( * ) Notice: Subject to any disclaimer, the term of this patent is extended or adjusted under 35 U.S.C. 154(b) by 58 days.

(21) Appl. No.: 18/251,462

(22) PCT Filed: Nov. 3, 2021

(86) PCT No.: PCT/SE2021/051097
§ 371 (c)(1),
(2) Date: May 2, 2023

(87) PCT Pub. No.: WO2022/098282
PCT Pub. Date: May 12, 2022

(65) Prior Publication Data

US 2024/0017512 A1 Jan. 18, 2024

(30) Foreign Application Priority Data

Nov. 3, 2020 (SE) .................................... 2051273-7

(51) Int. Cl.

| | |
|---|---|
| ***B31B 50/20*** | (2017.01) |
| ***B31B 50/00*** | (2017.01) |
| ***B31B 50/26*** | (2017.01) |
| ***B31B 50/62*** | (2017.01) |
| *B31B 105/00* | (2017.01) |

(52) U.S. Cl.
CPC ............ *B31B 50/006* (2017.08); *B31B 50/20* (2017.08); *B31B 50/262* (2017.08); *B31B 50/624* (2017.08); *B31B 2105/00* (2017.08)

(58) Field of Classification Search
CPC ..... B31B 50/006; B31B 50/20; B31B 50/624; B31B 50/262
USPC .............................................................. 493/8
See application file for complete search history.

(56) References Cited

U.S. PATENT DOCUMENTS

2024/0017512 A1* 1/2024 Hallendorff ............. B31B 50/20

* cited by examiner

*Primary Examiner* — Praachi M Pathak
(74) *Attorney, Agent, or Firm* — Boisbrun Hofman, PLLC

(57) ABSTRACT

A method for manufacturing of cartons by a carton manufacturing system comprising a piece assembly unit and a piece attaching unit. The method may comprise steps: A) retrieving a set of measurements of an intended content to be enclosed in a final carton; B) calculating a width X1 and a length Y1 of a first carton piece, and a width X2 and a length Y2 of a second carton piece; C) providing the first carton piece with the width X1 and the length Y1, and a second carton piece with the width X2 and the length Y2; D) assembling the first and the second carton piece into a detachable carton piece assembly; and E) attaching the first and the second carton piece to form a carton assembly by placing a first edge of the first carton piece is against a second edge of the second carton piece.

11 Claims, 12 Drawing Sheets

METHOD FOR MANUFACTURING OF CARTONS

CROSS-REFERENCE TO RELATED APPLICATIONS

This application is a national stage of, and claims priority to and the benefit of, International Patent Application No. PCT/SE2021/051097, titled "METHOD FOR MANUFACTURING OF CARTONS," filed Nov. 3, 2021, which claims priority to and the benefit of Swedish Patent Application No. SE2051273-7, titled "DOWNHOLE TENSION SENSING APPARATUS," filed Nov. 3, 2020, the entire disclosures of which are hereby incorporated herein by reference.

TECHNICAL FIELD

The present invention relates to a method for manufacturing of cartons.

BACKGROUND

A carton is a box or a container, usually made of paperboard and sometimes of corrugated fibreboard. Many types of cartons are used in packaging. Sometimes a carton is also called a box.

A carton is a type of packaging suitable for food, pharmaceuticals, hardware, and many other types of products. Folding cartons are usually combined into a tube at the manufacturer and shipped flat to the packager.

Cartons have been used at least since the end of the 19th century for separating different types of goods, and for improving the logistical process.

The steady growth of e-commerce in the last decades has resulted in a substantial growth of cartons being shipped every year. This as every specific shipment to a client, including one or several physical products, has to be individually packaged e.g. in a carton. The carton is then either transported by the freight delivery service to a local delivery point and finally collected by the individual end customer, or directly delivered by the freight delivery service to the end customers' letter box or to the doorstep. When individual end customers personally purchase their goods in a physical store instead, and subsequently transport these in their own vehicles to their homes, cartons are on the contrary not needed.

There are substantial facts found that cartons often contain large amounts of unused volume as standard cartons most often are used. These standard cartons have not been optimised size-wise with regards to the intended content. I.e. a lot of air is transported from warehouses to end consumers. This current situation could also be rephrased to that the transports from warehouses to end consumer are not optimised. E-commerce businesses, transport companies as well as consumers may benefit financially if transports of goods are better optimised.

Due to the climate warming many governments and larger economic unions have now set tough targets to decrease the greenhouse gas emissions. The transport sector is prioritised, as this represents a large part of the total greenhouse gas emissions.

The substantial growth of cartons e.g. due to the steady growth of e-commerce counteract the efforts in decreasing the greenhouse gas emissions.

There would also be a significant advantage if some size aspects of the raw material for the cartons could be standardised so that the logistics of the raw material and the manufacturing process itself of said cartons also could be optimised.

Therefore, it exists a need in decreasing the relatively large volumes of unnecessary air shipped by for instance optimising the cartons sizes to the intended content. In parallel to this it exists a need in standardising some size aspects of the raw material for the cartons in an intelligent manner, so that the logistics of the raw material and the manufacturing process itself of said cartons could be optimised.

SUMMARY OF INVENTION

An objective of the present invention is thus to accomplish a method for manufacturing of cartons that support the objectives to decrease the relatively large volumes of unnecessary air shipped for subsequently decreasing the greenhouse gas emissions, and to standardise some size aspects of the raw material so that the logistics of the raw material for the cartons and the carton manufacturing process itself of said cartons could be optimised.

According to one aspect, the invention concerns a method for manufacturing of cartons. The method is conducted by a carton manufacturing system comprising a piece assembly unit and a piece attaching unit. The method comprises the steps of: A. retrieving a set of measurements of an intended content to be enclosed in a final carton. B. calculating the required width $X1=x1*(y1^n)$ and the required length Y1 of a first carton piece, and the required width $X2=x2*(y2^n)$ and the required length Y2 of a second carton piece. x1, x2>0, n=0, 1, 2, 3 . . . , and y1, y2>0, for enabling the intended content to be enclosed in the final carton assembled by the first and the second carton piece. C. providing the first carton piece with a width of $X1=x1*(y1^n)$ and a length of Y1, and the second carton piece with a width of $X2=x2*(y2^n)$ and a length of Y2. x1, x2>0, n=0, 1, 2, 3 . . . , and y1, y2>0, for the first and the second carton piece to match the calculated required widths X1, X2 and lengths Y1, Y2, D. assembling the first and the second carton piece into a detachable carton piece assembly by using the piece assembly unit, for the detachable carton piece assembly to match the set of measurements of the intended content, and E. attaching the first and the second carton piece by using the piece attaching unit for creation of a carton assembly.

An advantage with the solution, is that a carton assembly is created using standardised pieces of carton based upon one or several predefined sizes of carton material. This implies that the logistics process in the preparation phases of creating a final carton is optimised. This further supports the objective to decrease the relatively large volumes of unnecessary air shipped for subsequently decreasing greenhouse gas emissions. In some legislations where there are legislative demands of manufactures minimising the sizes of cartons in order to decrease the carbon emissions when transporting the final cartons, these legislative demands could be met using this method.

The method above may be configured according to different optional embodiments. For example, wherein the carton manufacturing system may further comprise a control unit. The control unit may be arranged to communicate with a database. In the retrieving step A, the set of measurements of an intended content may be retrieved from the database, by means of the control unit. In the calculating step B, the calculations may be conducted by means of the control unit.

An advantage with the solution, is that a carton assembly is created using carton pieces of the same width. This implies that the logistics process in the preparation phases of creating a final carton is optimised.

According to an embodiment of the invention, y1, y2 may=1.

An advantage with the solution, is that a carton assembly is created using carton pieces based upon a binary sequence with regards to width. The width of the carton pieces could for instance be 2, 4, 8, 16, 32 and 64 centimetres. This implies that the logistics process in the preparation phases of creating a final carton is optimised.

According to an embodiment of the invention, y1, y2 may=2.

An advantage with the solution, is that a final carton is created using standardised pieces of carton based upon one or several predefined sizes of carton material. This implies that the logistics process of creating a final carton is optimised. This further supports the objective to decrease the relatively large volumes of unnecessary air shipped for subsequently decreasing greenhouse gas emissions. In some legislations where there are legislative demands of manufactures minimising the sizes of cartons in order to decrease the carbon emissions when transporting the final cartons, these legislative demands could be met using this method.

According to an embodiment of the invention, the carton manufacturing system may further comprise a slit generating unit, and a folding unit. The method may further comprise the steps of: F. forming a plurality of slits in the carton assembly by using the slit generating unit, and G. folding the carton assembly, and folding in a plurality of flaps formed by the plurality of slits, by using the folding unit, to form the final carton for the purpose of accommodation of the intended content.

An advantage with the solution, is that a final carton may even better be created using standardised pieces of carton based upon one or several predefined sizes of carton material. This implies that the logistics process of creating a final carton may be even more optimised. This further supports the objective to decrease the relatively large volumes of unnecessary air shipped for subsequently decreasing greenhouse gas emissions.

According to an embodiment of the invention, step C may comprise: C1+. retrieving a raw piece of carton, C2+. cutting the first carton piece in a width of X1=x1*(y1^n) out of the raw piece of carton and cutting the second carton piece in a width of X2=x2*(y2^n) out of the raw piece of carton by using a width cutting unit, and C3+. cutting the first carton piece in a length of Y1 out of the raw piece of carton and cutting the second carton piece in a length of Y2 out of the raw piece of carton by using a length cutting unit, for the first and the second carton piece to match the calculated required sizes.

An advantage with the solution, is that a final carton may even better be created using standardised pieces of carton based upon one or several predefined sizes of carton material. This implies that the logistics process of creating a final carton may be even more optimised. This further supports the objective to decrease the relatively large volumes of unnecessary air shipped for subsequently decreasing greenhouse gas emissions.

According to an embodiment of the invention, step E may comprise: E+. attaching the first and the second carton piece by means of attaching means by using the piece attaching unit.

An advantage with the solution, is that a final carton may even better be created using standardised pieces of carton based upon one or several predefined sizes of carton material. This implies that the logistics process of creating a final carton may be even more optimised. This further supports the objective to decrease the relatively large volumes of unnecessary air shipped for subsequently decreasing greenhouse gas emissions.

According to an embodiment of the invention, step E may comprise: E+. attaching the first and the second carton piece by using the piece attaching unit by: i. using an adhesive agent on a first edge of the first carton piece and/or on a second edge of the second carton piece, and ii. placing said first edge of the first carton piece against or on to said second edge of the second carton piece for the adhesive agent to take effect for attaching of the first and the second piece for creation of a carton assembly.

An advantage with the solution, is that a final carton may even better be created using standardised pieces of carton based upon one or several predefined sizes of carton material. This implies that the logistics process of creating a final carton may be even more optimised. This further supports the objective to decrease the relatively large volumes of unnecessary air shipped for subsequently decreasing greenhouse gas emissions.

According to an embodiment of the invention, the slit generating unit may be a slit cutting unit.

An advantage with the solution, is that a final carton may even better be created using standardised pieces of carton based upon one or several predefined sizes of carton material. Furthermore, the manufacturing equipment may physically be smaller in size using, according to this embodiment. This implies that the logistics process of creating a final carton may be even more optimised. This further supports the objective to decrease the relatively large volumes of unnecessary air shipped for subsequently decreasing greenhouse gas emissions.

According to an embodiment of the invention, the carton manufacturing system may further comprise a point of production. Steps C3+-G may be conducted at the point of production.

An advantage with the solution, is that a final carton may even better be created using standardised pieces of carton based upon one or several predefined sizes of carton material. Furthermore, the manufacturing equipment may physically be even smaller in size using, according to this embodiment. This implies that the logistics process of creating a final carton may be even more optimised. This further supports the objective to decrease the relatively large volumes of unnecessary air shipped for subsequently decreasing greenhouse gas emissions.

According to an embodiment of the invention, the carton manufacturing system may further comprise a point of production. Steps C1+-G may be conducted at the point of production.

An advantage with the solution, is that a final carton may even better be created using standardised pieces of carton based upon one or several predefined sizes of carton material. Furthermore, the manufacturing equipment may produce cartons in a swifter manner, according to this embodiment. This implies that the logistics process of creating a final carton may be even more optimised. This further supports the objective to decrease the relatively large volumes of unnecessary air shipped for subsequently decreasing greenhouse gas emissions.

According to an embodiment of the invention, the carton manufacturing system may further comprise a carton piece feeding unit. The method may further comprise after step C3+ the step of: C4+ feeding the first and the second carton piece from the length cutting unit to the piece assembly unit by using the carton piece feeding unit. The piece assembly unit is arranged on a distance from the length cutting unit. The point of production in this step may be moved from the length cutting unit to the piece assembly unit.

An advantage with the solution, is that a final carton may even better be created using standardised pieces of carton based upon one or several predefined sizes of carton material. Furthermore, the manufacturing equipment may produce cartons in an even swifter manner, according to this embodiment. This implies that the logistics process of creating a final carton may be even more optimised. This further supports the objective to decrease the relatively large volumes of unnecessary air shipped for subsequently decreasing greenhouse gas emissions.

According to an embodiment of the invention, the carton manufacturing system may further comprise a main feeding unit. The method may further comprise the steps of: D+. feeding the detachable carton piece assembly from the piece assembly unit to the piece attaching unit by using the main feeding unit. The piece attaching unit may be arranged on a distance from the piece assembly unit. The point of production in this step may be moved from the piece assembly unit to the piece attaching unit, E+. feeding the carton assembly from the piece attaching unit to the slit generating unit by using the main feeding unit. The slit generating unit may be arranged on a distance from the piece attaching unit. The point of production in this step is moved from the piece attaching unit to the slit generating unit. F+. feeding the carton assembly from the slit generating unit to the folding unit by using the main feeding unit. The folding unit may be arranged on a distance from the slit generating unit. The point of production in this step may be moved from the slit generating unit to the folding unit.

An advantage with the solution, is that a final carton may even better be created using standardised pieces of carton based upon one or several predefined sizes of carton material. Furthermore, the manufacturing equipment may produce cartons in a more refined manner, according to this embodiment. This implies that the logistics process of creating a final carton may be even more optimised. This further supports the objective to decrease the relatively large volumes of unnecessary air shipped for subsequently decreasing greenhouse gas emissions.

According to a second aspect, the invention concerns a computer program product comprising coded instructions to implement a method when the computer program product is executed in a processor.

According to a third aspect, the invention concerns a computer readable medium storing a computer program product.

According to a fourth aspect, the invention concerns a carton manufacturing system comprising a piece assembly unit and a piece attaching unit. The carton manufacturing system is arranged to support the steps of: A. retrieving a set of measurements of an intended content to be enclosed in a final carton. B. calculating the required width X1=x1*(y1^n) and the required length Y1 of a first carton piece, and the required width X2=x2*(y2^n) and the required length Y2 of a second carton piece. x1, x2>0, n=0, 1, 2, 3 . . . , and y1, y2>0, for enabling the intended content to be enclosed in the final carton assembled by the first and the second carton piece. C. providing the first carton piece with a width of X1=x1*(y1^n) and a length of Y1, and the second carton piece with a width of X2=x2*(y2^n) and a length of Y2. x1, x2>0, n=0, 1, 2, 3 . . . , and y1, y2>0, for the first and the second carton piece to match the calculated required widths X1, X2 and lengths Y1, Y2. D. assembling the first and the second carton piece into a detachable carton piece assembly by using the piece assembly unit, for the detachable carton piece assembly to match the set of measurements of the intended content, and E. attaching the first and the second carton piece by using the piece attaching unit for creation of a carton assembly.

An advantage with the solution, is that a carton assembly is created using standardised pieces of carton based upon one or several predefined sizes of carton material. This implies that the logistics process in the preparation phases of creating a final carton is optimised. This further supports the objective to decrease the relatively large volumes of unnecessary air shipped for subsequently decreasing greenhouse gas emissions. In some legislations where there are legislative demands of manufactures minimising the sizes of cartons in order to decrease the carbon emissions when transporting the final cartons, these legislative demands could be met using this method.

A computer aided material handling system may provide data about e.g. the size of the intended content. The required size of the first and the second carton piece to together match the intended content is then calculated by the control unit. The control unit may also provide data about e.g. the required size of the detachable carton piece assembly to match the intended content.

A human being may directly via a user interface provide data about e.g. the size of the intended content.

The carton piece assembly unit gathers the first and the second carton piece into a detachable carton piece assembly in such a formation that the detachable carton piece assembly matches the intended content.

The carton piece feeding unit may feed the first and the second carton piece either in a vertical or in a horizontal direction.

The main feeding unit may feed the detachable carton piece assembly and the carton assembly either in a vertical or in a horizontal direction.

The width cutting unit and the length cutting unit could be comprised in one unit.

The width cutting unit, the length cutting unit and the final cutting unit could be comprised in one unit.

The intended content could include one or several physical items.

The raw piece of carton can either come in separate sheets, in sheets connected to each other and folded on top of each other, or on a continuous roll.

The attaching means could for instance be glue, adhesive tape or staples, among others.

The adhesive agent could either be glue or adhesive tape, among others.

The system may of course handle more carton pieces than the first and the second carton piece.

In addition to the described steps, the system may also control and manage to put the intended content in the final carton or in the refined final carton, and subsequently to close the final carton or the refined final carton.

A set of measurements of an intended content may include for instance the width, the length and the height, among other measurement parameters, of the intended content.

The width of the strips could for instance be "X"=x*(y^n), where x>0, where n=0, 1, 2, 3 . . . , where y=2.

Theoretical example 1/1: For x=1, y=2: for n=0 then $x_0$=1; for n=1 then $x_1$=2; for n=2 then $x_2$=4; for n=3 then $x_3$=8; for n=4 then $x_4$=16 etc. For x=2, y=2: for n=0 then $x_0$=2; for n=1 then $x_1$=4; for n=2 then $x_2$=8; for n=3 then $x_3$=16, for n=4 then $x_4$=32 etc. For x=4, y=2: for n=0 then $x_0$=4; for n=1 then $x_{1=8}$, for n=2 then $x_2$=16; for n=3 then $x_3$=32; for n=4 then $x_4$=64 etc.

The width of the strips could for instance be "X"=x*(y^n), where x>0, where n=0, 1, 2, 3 . . . , where y=4.

Applied example 1/3: for x=4 cm and a width of 76 cm is needed. For x=4, y=4: for n=0 then $x_0$=4; for n=1 then $x_1$=8; for n=2 then $x_2$=16; for n=3 then $x_3$=32; for n=4 then $x_4$=64 etc. We would then need the following strips of carton: One 64 cm, remaining 12 cm (78–64), one 8 cm, remaining 4 cm (12–8), one 4 cm, remaining 0 cm (4–4).

Applied example 2/3: for x=4 cm and a width of 48 cm is needed. For x=4, y=4: for n=0 then $x_0$=4; for n=1 then $x_1$=8; for n=2 then $x_2$=16; for n=3 then $x_3$=32; for n=4 then $x_4$=64 etc. We would then need the following strips of carton: One 32 cm, remaining 12 cm (48-32), one 16 cm, remaining 0 cm (16-16).

Applied example 3/3: for x=4 cm and a width of 50 cm is needed. If using x=4 the possible width X is a multiple of 4. We would then need to choose the first value of multiple 4 larger than 50, which in this case is 52. For x=4, y=4: for n=0 then $x_0$=4; for n=1 then $x_1$=8; for n=2 then $x_2$=16; for n=3 then $x_3$=32; for n=4 then $x_4$=64 etc. We would then need the following strips of carton: One 32 cm, remaining 20 cm (52–32), one 16 cm, remaining 4 cm (20–16), one 4 cm, remaining 0 cm (4–4).

BRIEF DESCRIPTION OF DRAWINGS

The invention is now described, by way of example, with reference to the accompanying drawings, in which.

DESCRIPTION OF EMBODIMENTS

In the following, a detailed description of a method for manufacturing of cartons and a carton manufacturing system, is provided.

Figure 1:
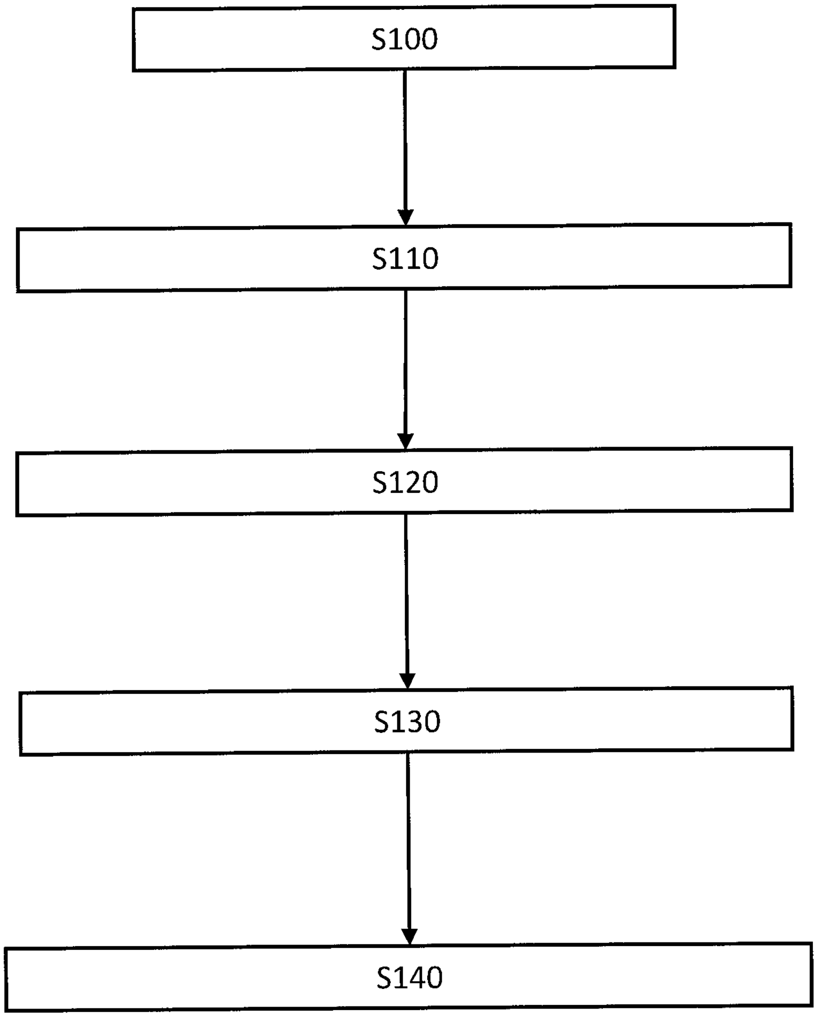
FIG. 1 is a flow chart of a procedure according to an embodiment.

FIG. 1 shows a flow chart illustrating a procedure in a computer program product. The various actions may come in different orders than presented in this description, or in a different order than shown in this or other flowcharts related to this description, or some steps may be performed in parallel.

In a step S100 a set of measurements 5 of an intended content 6 to be enclosed in a final carton 7 is retrieved. In a step S110 the required width X1=$x_1$*(y1^n) and the required length Y1 of a first carton piece 8, and the required width X2=$x_2$*(y2^n) and the required length Y2 of a second carton piece 9 is calculated, wherein $x_1$, $x_{2>0}$, n=0, 1, 2, 3 . . . , and y1, y2>0, for enabling the intended content 6 to be enclosed in the final carton 7 assembled by the first 8 and the second carton piece 9. In a step S120 the first carton piece 8 with a width of X1=$x_1$*(y1^n) and a length of Y1, and the second carton piece 9 with a width of X2=$x_2$*(y2^n) and a length of Y2 is provided, wherein $x_1$, $x_{2>0}$, n=0, 1, 2, 3 . . . , and y1, y2>0, for the first 8 and the second carton piece 9 to match the calculated required widths X1, X2 and lengths Y1, Y2. In a step S130 the first 8 and the second carton piece 9 are assembled into a detachable carton piece assembly 10 by using the piece assembly unit 3 for the detachable carton piece assembly 10 to match the set of measurements of the intended content 6. In a step S140 the first 8 and the second carton piece 9 are attached by using the piece attaching unit 4 for creation of a carton assembly 11.

Figure 2:
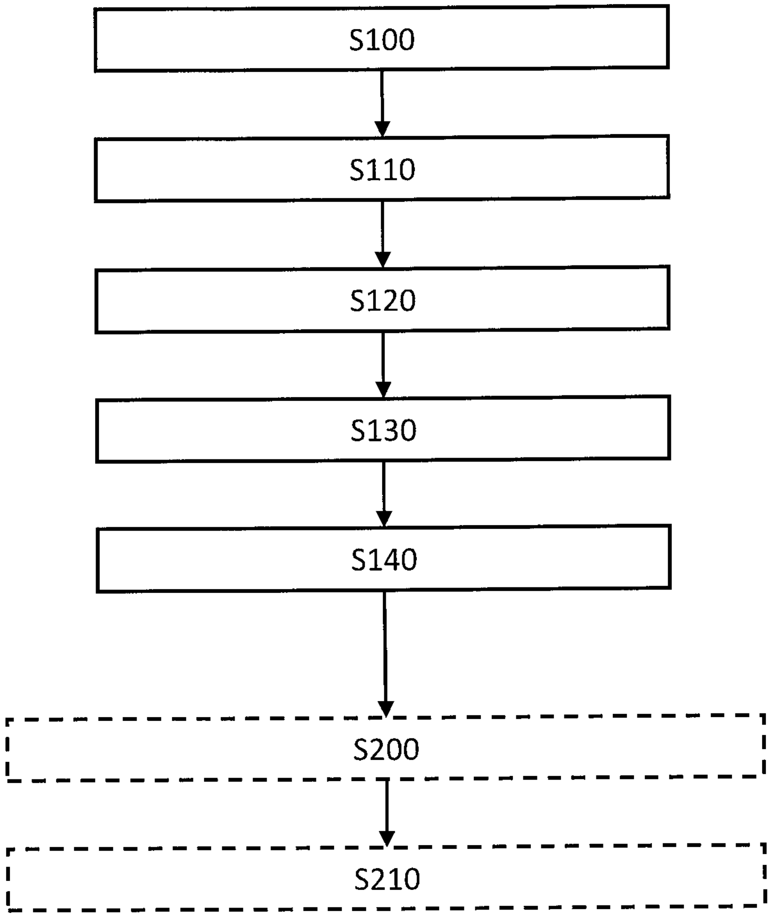
FIG. 2 is a flow chart of a procedure according to an embodiment.

FIG. 2 shows a flow chart illustrating a procedure in a computer program product. The various actions may come in different orders than presented in this description, or in a different order than shown in this or other flowcharts related to this description, or some steps may be performed in parallel.

In a step S200 a plurality of slits 14*a* . . . 14*z* in the carton assembly 11 are formed by using the slit generating unit 12. In a step S210 the carton assembly 11 is folded, and a plurality of flaps 15*a* . . . 15*z* formed by the plurality of slits 14*a* . . . 14*z* are folded in, by using the folding unit 13, to form the final carton 7 for the purpose of accommodation of the intended content 6.

Figure 3:
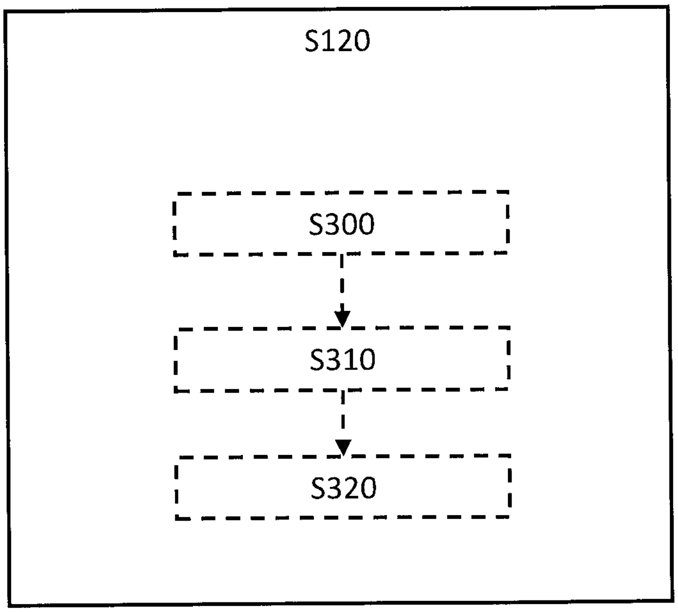
FIG. 3 is a flow chart of a procedure according to an embodiment.

FIG. 3 shows a flow chart illustrating a procedure in a computer program product. The various actions may come in different orders than presented in this description, or in a different order than shown in this or other flowcharts related to this description, or some steps may be performed in parallel.

In a step S300 a raw piece of carton 16 is retrieved. In a step S310 the first carton piece 8 is cut in a width of X1=$x_1$*(y1^n) out of the raw piece of carton 16 and the second carton piece 9 is cut in a width of X2=$x_2$*(y2^n) out of the raw piece of carton 16 by using a width cutting unit 17. In a step S320 the first carton piece 8 is cut in a length of Y1 out of the raw piece of carton 16 and the second carton piece 9 is cut in a length of Y2 out of the raw piece of carton 16 by using a length cutting unit 18, for the first 8 and the second carton piece 9 to match the calculated required sizes.

Figure 4A:
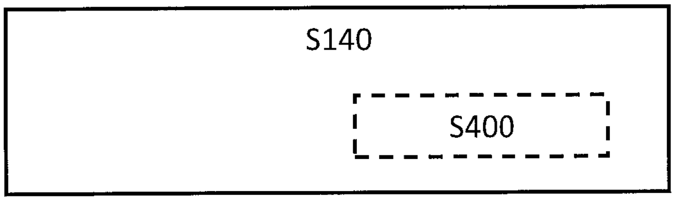
FIGS. 4*a* and 4*b* are flow charts of procedures according to different embodiments.
Figure 4B:
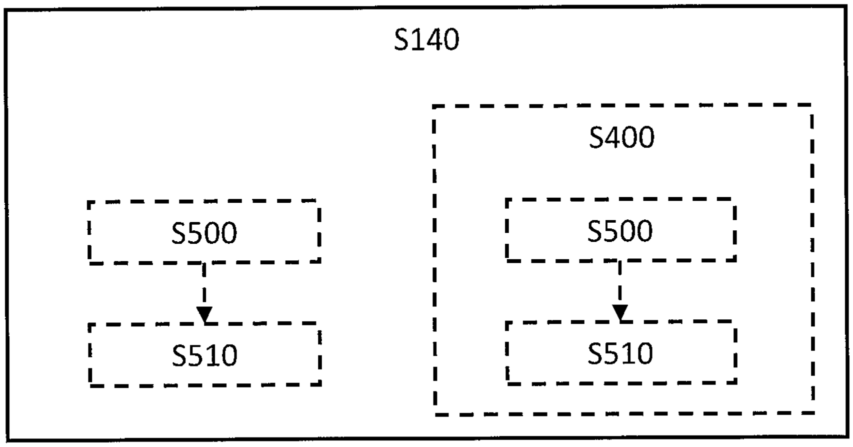

FIGS. 4*a* and 4*b* show flow charts illustrating procedures in a computer program product. The various actions may come in different orders than presented in this description, or in a different order than shown in these or other flowcharts related to this description, or some steps may be performed in parallel.

In a step S400 the first 8 and the second carton piece 9 are attached by means of attaching means 19 by using the piece attaching unit 4.

In a step S500 an adhesive agent 20 is used on a first edge 21 of the first carton piece 8 and/or on a second edge 22 of the second carton piece 9. In a step S510 said first edge 21 of the first carton piece 8 is placed against or on to said second edge 22 of the second carton piece 9 for the adhesive agent 20 to take effect for attaching of the first 8 and the second piece 9 for creation of a carton assembly 11.

Figure 5A:
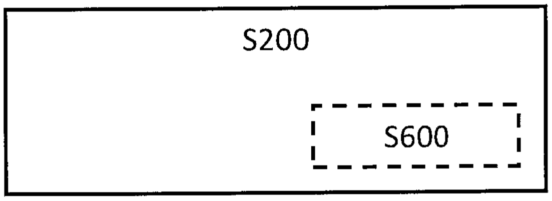
FIGS. 5*a* and 5*b* are flow charts of procedures according to different embodiments.
Figure 5B:
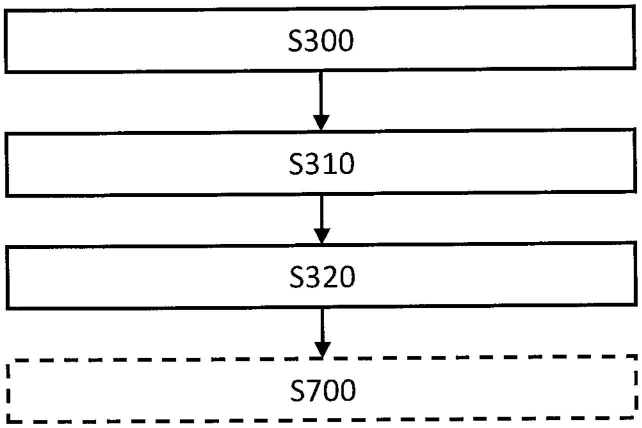

FIGS. 5*a* and 5*b* show flow charts illustrating procedures in a computer program product. The various actions may come in different orders than presented in this description, or in a different order than shown in these or other flowcharts related to this description, or some steps may be performed in parallel.

In a step S600 the plurality of slits 14*a* . . . 14*z* in the carton assembly 11 are formed by using a slit cutting unit 23.

In a step S700 the first 8 and the second carton piece 9 are fed from the length cutting unit 18 to the piece assembly unit 3 by using the carton piece feeding unit 25, wherein the piece assembly unit 3 is arranged on a distance from the length cutting unit 18, wherein the point of production 24 in this step is moved from the length cutting unit 18 to the piece assembly unit 3.

Figure 6A:
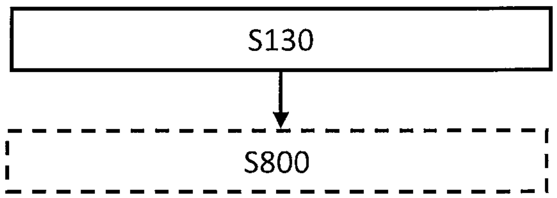
FIGS. 6*a*, 6*b* and 6*c* are flow charts of procedures according to different embodiments.
Figure 6B:
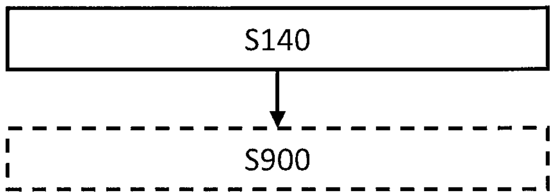
Figure 6C:
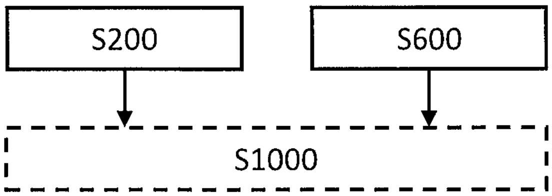

FIGS. 6*a*, 6*b* and 6*c* show flow charts illustrating procedures in a computer program product. The various actions may come in different orders than presented in this description, or in a different order than shown in these or other flowcharts related to this description, or some steps may be performed in parallel.

In a step S800 the detachable carton piece assembly 10 is fed from the piece assembly unit 3 to the piece attaching unit 4 by using the main feeding unit 26, wherein the piece attaching unit 4 is arranged on a distance from the piece assembly unit 3, wherein the point of production 24 in this step is moved from the piece assembly unit 3 to the piece attaching unit 4.

In a step S900 the carton assembly 11 is fed from the piece attaching unit 4 to the slit generating unit 12 by using the main feeding unit 26, wherein the slit generating unit 12 is arranged on a distance from the piece attaching unit 4, wherein the point of production 24 in this step is moved from the piece attaching unit 4 to the slit generating unit 12.

In a step S1000 the carton assembly 11 is fed from the slit generating unit 12 to the folding unit 13 by using the main feeding unit 26, wherein the folding unit 13 is arranged on a distance from the slit generating unit 12, wherein the point of production 24 in this step is moved from the slit generating unit 12 to the folding unit 13.

Figure 7:
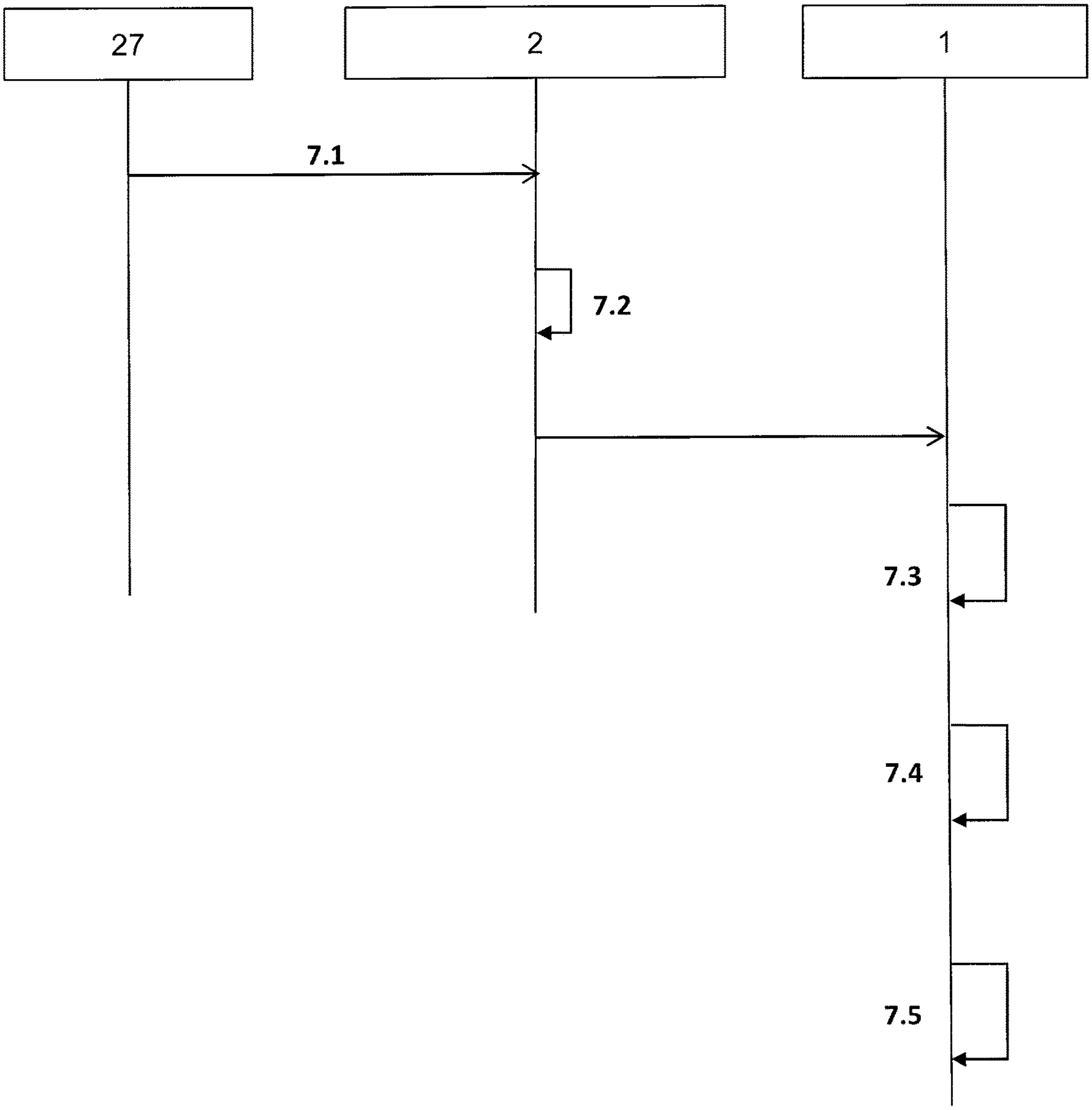
FIG. 7 is a flow chart of a procedure according to an embodiment.

FIG. 7 shows a flow chart illustrating a procedure in a computer program product. The various actions may come in different orders than presented in this description, or in a different order than shown in this or other flowcharts related to this description, or some steps may be performed in parallel.

In a step 7.1 a set of measurements 5 of an intended content 6 to be enclosed in a final carton 7 is retrieved from the database 27. In a step 7.2 the required width $X1=x_1*(y1\hat{}n)$ and the required length Y1 of a first carton piece 8, and the required width $X2=x_2*(y2\hat{}n)$ and the required length Y2 of a second carton piece 9 is calculated at the control unit 2 of the carton manufacturing unit 1, wherein $x_1$, $x_{2>0}$, n=0, 1, 2, 3 . . . , and y1, y2>0, for enabling the intended content 6 to be enclosed in the final carton 7 assembled by the first 8 and the second carton piece 9. In a step 7.3 the first carton piece 8 with a width of $X1=x_1*(y1\hat{}n)$ and a length of Y1, and the second carton piece 9 with a width of $X2=x_2*(y2\hat{}n)$ and a length of Y2 is provided at the carton manufacturing unit 1, wherein $x_1$, $x_{2>0}$, n=0, 1, 2, 3 . . . , and y1, y2>0, for the first 8 and the second carton piece 9 to match the calculated required widths X1, X2 and lengths Y1, Y2. In a step 7.4 the first 8 and the second carton piece 9 are assembled into a detachable carton piece assembly 10 at the carton manufacturing unit 1 by using the piece assembly unit 3 for the detachable carton piece assembly 10 to match the set of measurements 5 of the intended content 6. In a step 7.5 the first 8 and the second carton piece 9 are attached at the carton manufacturing unit 1 by using the piece attaching unit 4 for creation of a carton assembly 11.

Figure 8:
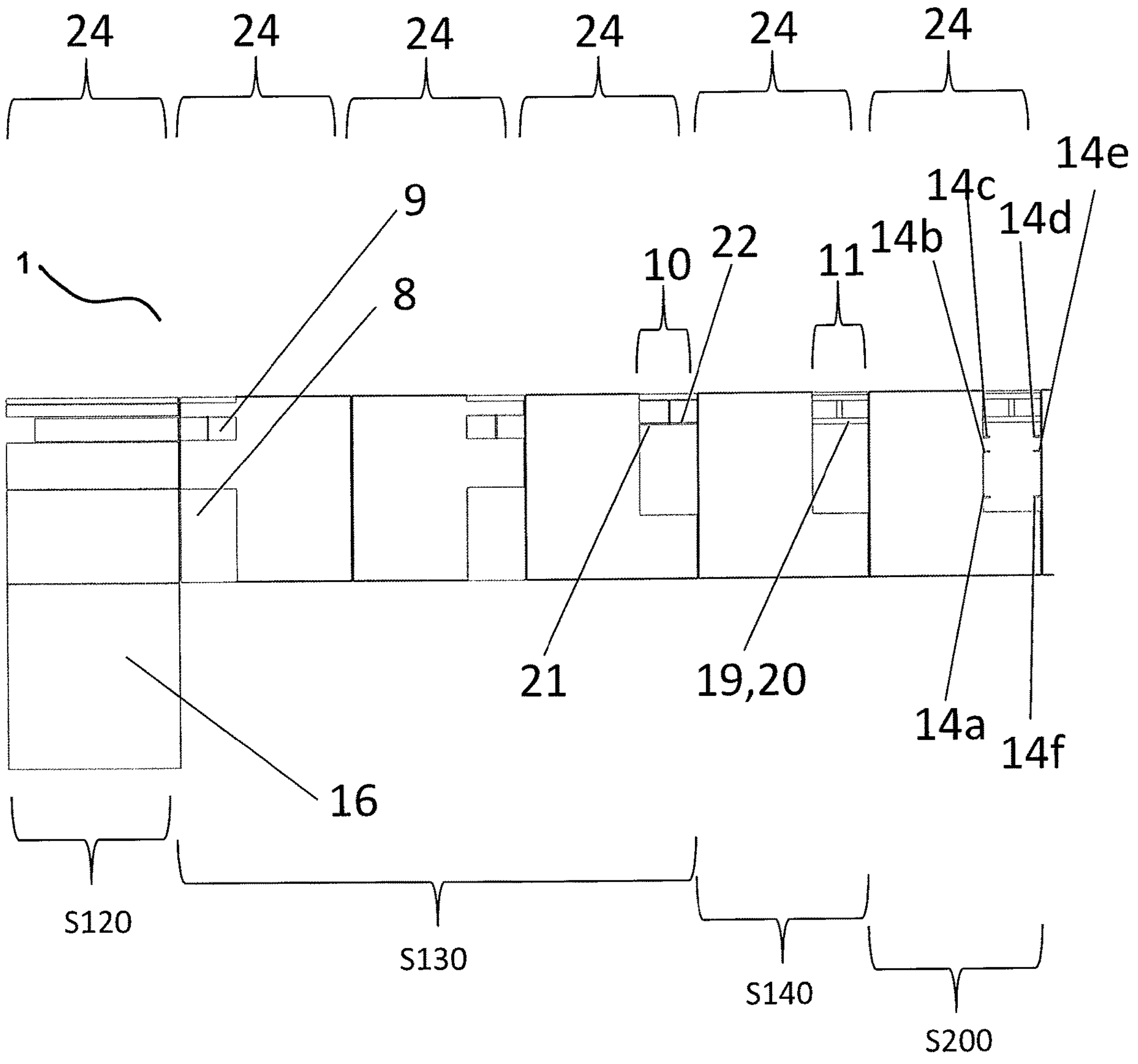
FIG. 8 shows a carton manufacturing system, from above, comprising four different method steps, according to an embodiment of the invention.

FIG. 8 shows a carton manufacturing system. Activities related to step S120, step S130, step S140 and step S200 are shown in sequence. A first 8 and a second carton piece 9 are shown, originating from a raw piece of carton 16, and transported to the different points of production 24. A detachable carton piece assembly 10 is shown comprising a first edge 21 of the first carton piece 21 and second edge 22 of the second carton piece 9. A carton assembly 11 is shown, wherein attaching means 19 such as an adhesive agent 20 are applied to said edges 22, 22. A plurality of slits 14*a* . . . 14*e* are formed in the carton assembly 11.

Figure 9:
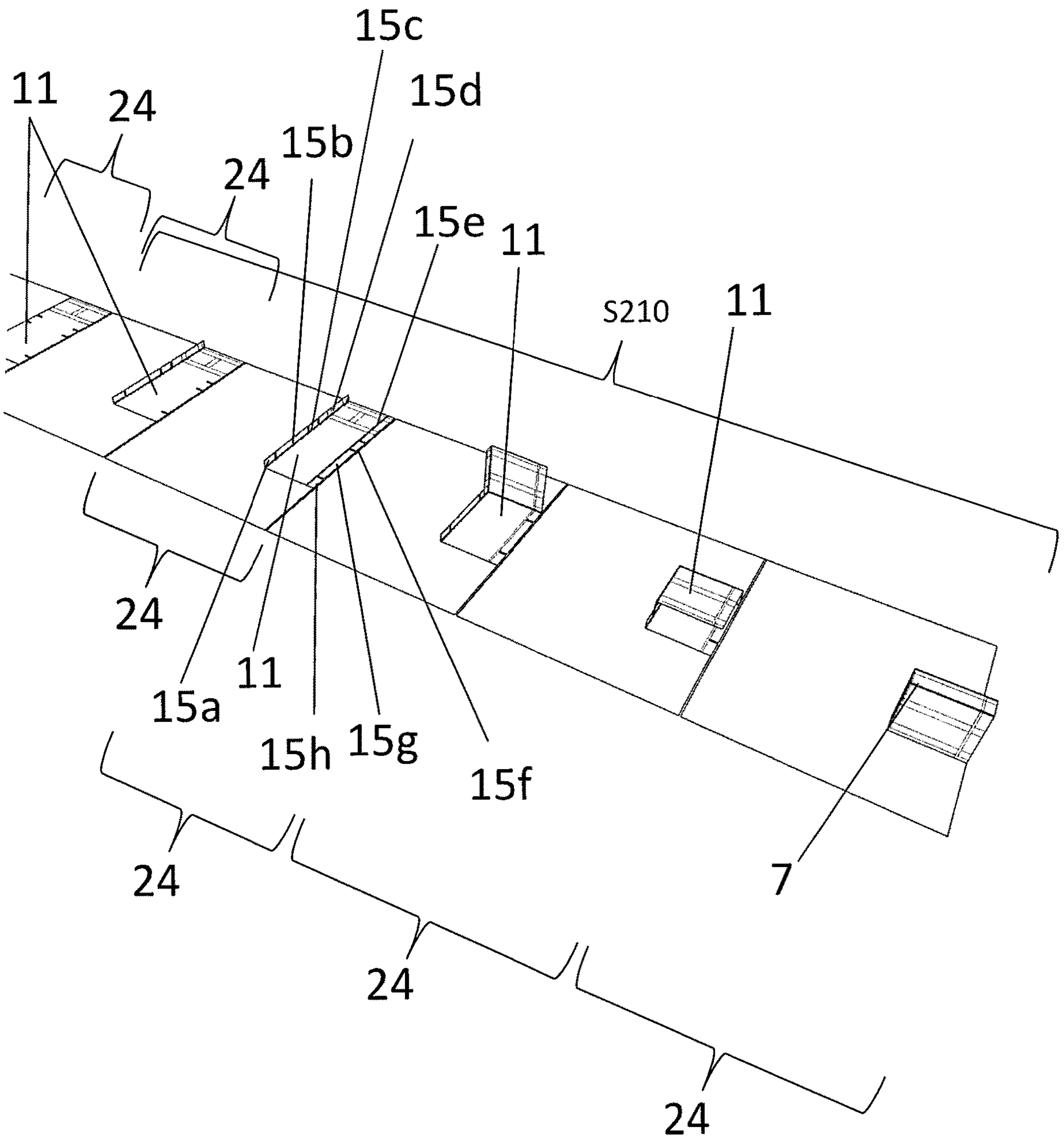
FIG. 9 shows a carton manufacturing system, in a perspective view, comprising one method step, according to an embodiment of the invention.

FIG. 9 shows a carton manufacturing system. Activities related to step S210 are shown in sequence. A carton assembly 11 is shown and transported to the different points of production 24, until a final carton 7 is finalised. The carton assembly 11 is folded and the plurality of flaps 15*a* . . . 15*h* formed by the plurality of slits are folded in.

Figure 10A:
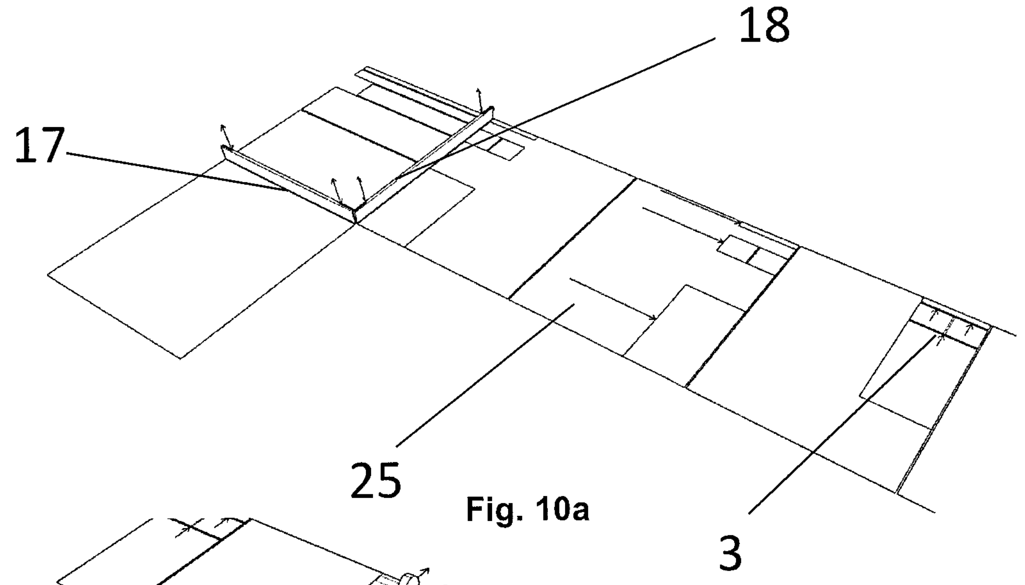
FIGS. 10*a*, 10*b* and 10*c* show a carton manufacturing system, in a perspective view, according to an embodiment of the invention, and FIGS. 11*a*, 11 *b* and 11*c* show three different examples of adding carton strips in order to achieve a required width and length.
Figure 10B:
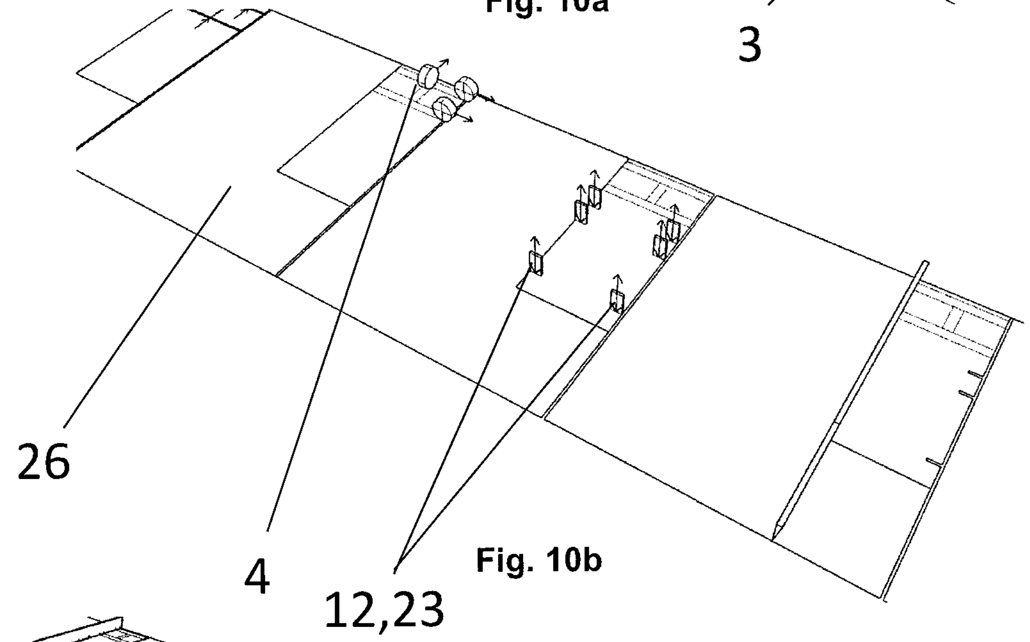
Figure 10C:
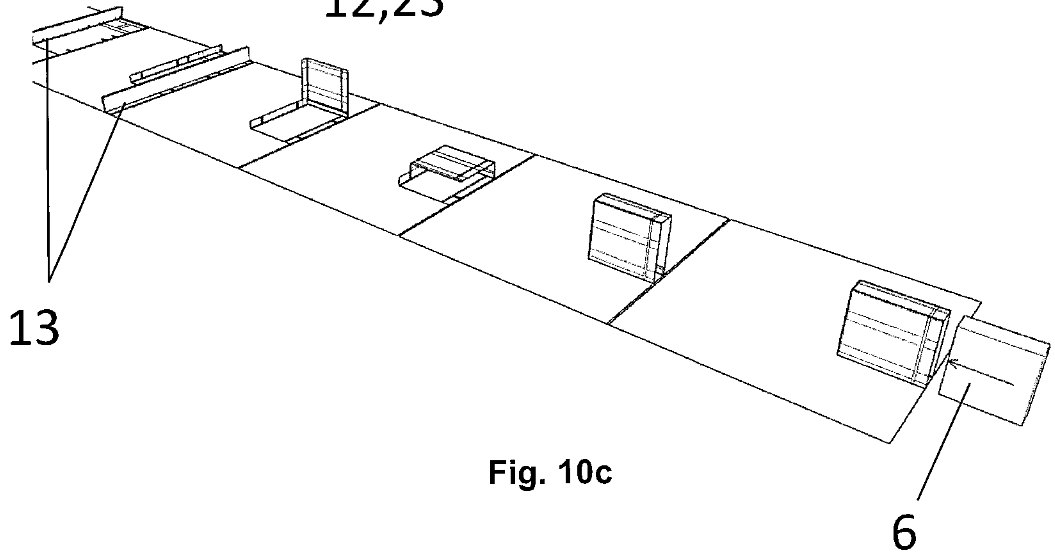

FIGS. 10*a*, 10*b* and 10*c* show a carton manufacturing system. In FIG. 10*a* a width cutting unit 17, a length cutting unit 18, a carton piece feeding unit 25 and a piece assembly unit 3 are shown. In FIG. 10*b* a main feeding unit 26, a piece attaching unit 4, a slit generating unit 12 and a slit cutting unit 23 are shown. In FIG. 10*c* a folding unit 13 and an intended content 6 are shown.

Figure 11A:
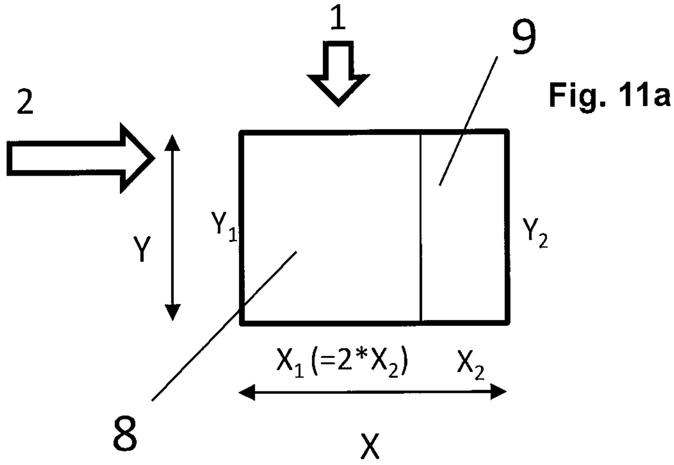
Figure 11B:
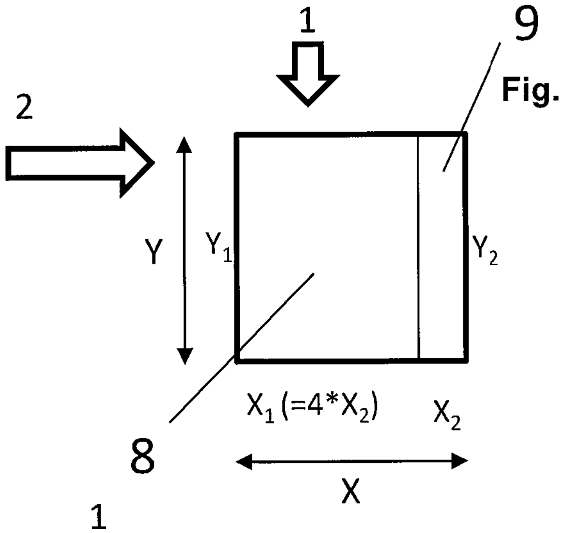
Figure 11C:
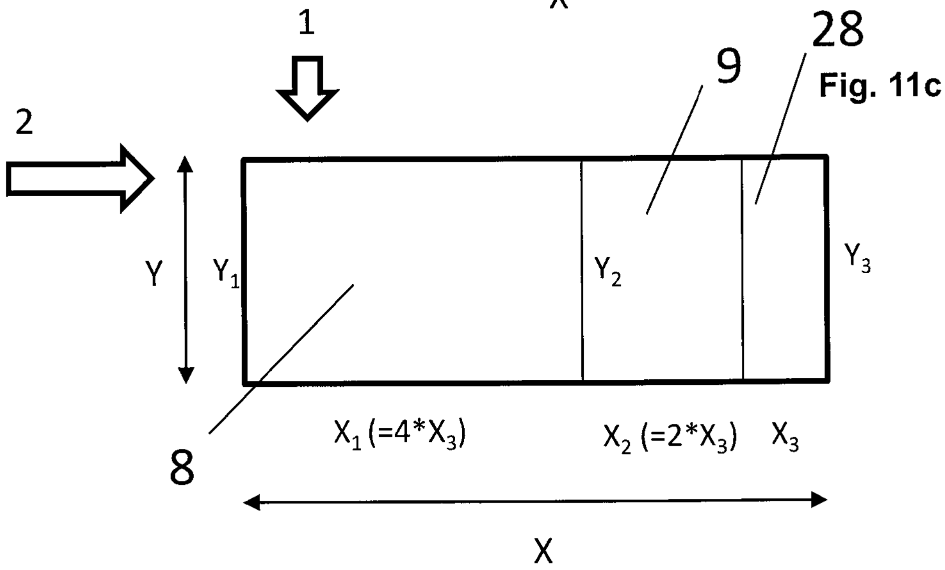

FIGS. 11*a*, 11*b* and 11*c* show three different examples of adding different carton pieces in order to achieve a carton assembly required widths X and required lengths Y. The arrow with reference number 1 illustrates the feeding direction of carton strips. The arrow 2 with reference number 2 illustrates the direction of adding carton strips. In FIG. 10*a* a first carton piece 8 with the width of $X_1$ and the length of $Y_1$ and a second carton piece 9 with the width of $X_2$ and the length of $Y_2$ are put together. Wherein the width $X_1$ equals two times the width of $X_2$. In FIG. 10*b* a first carton piece 8 with the width of $X_1$ and the length of $Y_1$ and a second carton piece 9 with the width of $X_2$ and the length of $Y_2$ are put together. Wherein the width $X_1$ equals four times the width of $X_2$. In FIG. 10*c* a first carton piece 8 with the width of $X_1$ and the length of $Y_1$, a second carton piece 9 with the width of $X_2$ and the length of $Y_2$, and a third carton piece 28 with the width of $X_3$ and the length of $Y_3$ are put together. Wherein the width $X_2$ equals two times the width of $X_3$, and wherein the width $X_1$ equals four times the width of $X_3$.

Figure 12:
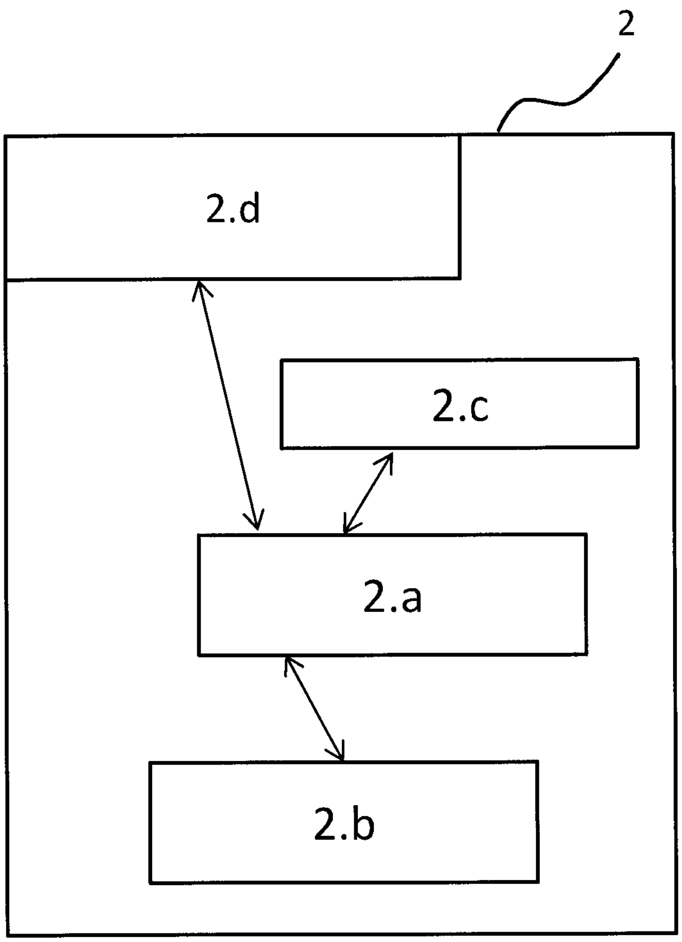
FIG. 12 is a block diagram illustrating a control unit, according to a possible embodiment.

FIG. 12 shows a block diagram of a control unit 2, comprising a processor 2.*a*, a user interface 2.*b*, a memory 2.*c*, and communication gateways 2.*d*. Through the communication gateways the control unit can receive and send signals from/to other parts of the system. Through the user interface the control unit can communicate with the user, through for instance a viewing screen, keyboard, mouse, printer, loudspeaker, microphone or other type of peripheral. The computer program product can be stored in the memory and be executed in the processor.

LIST OF COMPONENTS

- 1=carton manufacturing system
- 2=control unit
- 3=piece assembly unit
- 4=piece attaching unit
- 5=set of measurements of an intended content
- 6=intended content

7=final carton
8=first carton piece
9=second carton piece
10=detachable carton piece assembly
11=carton assembly
12=slit generating unit
13=folding unit
14*a*-14*z*=plurality of slits
15*a*-15*z*=plurality of flaps
16=raw piece of carton
17=width cutting unit
18=length cutting unit
19=attaching means
20=adhesive agent
21=first edge of the first carton piece
22=second edge of the second carton piece
23=slit cutting unit
24=point of production
25=carton piece feeding unit
26=main feeding unit
27=database
28=third carton piece

The invention claimed is:

1. A method for manufacturing of cartons performed by a carton manufacturing system comprising a piece assembly unit and a piece attaching unit, wherein the method comprises steps:

A) retrieving a set of measurements of an intended content to be enclosed in a final carton;

B) calculating a required width X1 and a required length Y1 of a first carton piece, and a required width X2 and a required length Y2 of a second carton piece for enabling the intended content to be enclosed in the final carton assembled by the first and the second carton piece, wherein the width X1 of the first carton piece is equal to 2, 4, 8, 16, 32 or 64 times the width X2 of the second carton piece;

C) providing the first carton piece with the width X1 and the length Y1, and a second carton piece with the width X2 and the length Y2;

D) assembling the first and the second carton piece into a detachable carton piece assembly by using the piece assembly unit for the detachable carton piece assembly to match the set of measurements of the intended content; and E) attaching the first and the second carton piece by using the piece attaching unit to form a carton assembly, wherein a first edge of the first carton piece is placed against or onto a second edge of the second carton piece for an adhesive agent to take effect for attaching of the first and the second piece to form the carton assembly.

2. The method for manufacturing of cartons of claim 1 wherein:

the carton manufacturing system further comprises a control unit;

the control unit is arranged to communicate with a database;

in the step A, the set of measurements of an intended content is retrieved from the database by the control unit; and in the step B, the calculations are performed by the control unit.

3. The method for manufacturing of cartons of claim 1 wherein the carton manufacturing system further comprises a slit generating unit and a folding unit, and wherein the method further comprises steps:

F) forming a plurality of slits in the carton assembly by using the slit generating unit; and G) folding the carton assembly and folding in a plurality of flaps formed by the plurality of slits by using the folding unit to form the final carton for the purpose of accommodation of the intended content.

4. The method for manufacturing cartons of claim 3 wherein the carton manufacturing system further comprises a point of production, and wherein the steps F and G are performed at the point of production.

5. The method for manufacturing of cartons of claim 3 wherein the carton manufacturing system further comprises a main feeding unit and a point of production, and wherein the method further comprises steps:

D1) feeding the detachable carton piece assembly from the piece assembly unit to the piece attaching unit by using the main feeding unit, wherein the piece attaching unit is arranged at a distance from the piece assembly unit, and wherein the point of production is moved from the piece assembly unit to the piece attaching unit;

E1) feeding the carton assembly from the piece attaching unit to the slit generating unit by using the main feeding unit, wherein the slit generating unit is arranged at a distance from the piece attaching unit, and wherein the point of production is moved from the piece attaching unit to the slit generating unit; and F1) feeding the carton assembly from the slit generating unit to the folding unit by using the main feeding unit, wherein the folding unit is arranged at a distance from the slit generating unit, and wherein the point of production in this step is moved from the slit generating unit to the folding unit.

6. The method for manufacturing of cartons of claim 1 wherein the step C comprises:

C1) retrieving a raw piece of carton;

C2) cutting the first carton piece in the width of X1 out of the raw piece of carton and cutting the second carton piece in the width of X2 out of the raw piece of carton by using a width cutting unit; and C3) cutting the first carton piece in the length of Y1 out of the raw piece of carton and cutting the second carton piece in the length of Y2 out of the raw piece of carton by using a length cutting unit.

7. The method for manufacturing of cartons of claim 6 wherein the carton manufacturing system further comprises a point of production, and wherein the step C3 is performed at the point of production.

8. The method for manufacturing of cartons of claim 6 wherein the carton manufacturing system further comprises a point of production, and wherein the steps C1-C3 are performed at the point of production.

9. The method for manufacturing of cartons of claim 6 wherein the carton manufacturing system further comprises a carton piece feeding unit and a point of production, and wherein the method further comprises, after the step C3, the step:

C4) feeding the first and the second carton piece from the length cutting unit to the piece assembly unit by using the carton piece feeding unit, wherein the piece assembly unit is arranged at a distance from the length cutting unit, and wherein the point of production is moved from the length cutting unit to the piece assembly unit.

10. The method for manufacturing of cartons of claim 1 wherein the step E comprises attaching the first and the second carton piece by using the piece attaching unit by:

E1) using an adhesive agent on a first edge of the first carton piece and/or on a second edge of the second carton piece, wherein the attaching includes use of at least one of a glue, an adhesive tape, and staples; and E2) placing said first edge of the first carton piece against or onto said second edge of the second carton piece for the adhesive agent to take effect for attaching of the first and the second piece to form the carton assembly.

11. A carton manufacturing system comprising a piece assembly unit and a piece attaching unit, wherein the carton manufacturing system is operable to perform steps:

A) retrieving a set of measurements of an intended content to be enclosed in a final carton;

B) calculating a required width X1 and a required length Y1 of a first carton piece, and a required width X2 and a required length Y2 of a second carton piece, wherein the width X1 of the first carton piece is equal to 2, 4, 8, 16, 32, or 64 times the width X2 of the second carton piece for enabling the intended content to be enclosed in the final carton assembled by the first and the second carton piece;

C) providing the first carton piece with the width of X1 and the length of Y1, and a second carton piece with the width of X2 and the length of Y2;

D) assembling the first and the second carton piece into a detachable carton piece assembly by using the piece assembly unit for the detachable carton piece assembly to match the set of measurements of the intended content; and E) attaching the first and the second carton piece by using the piece attaching unit to form a carton assembly, wherein a first edge of the first carton piece is placed against or onto a second edge of the second carton piece for an adhesive agent to take effect for attaching of the first and the second piece to form the carton assembly.

* * * * *